US012579084B1

(12) United States Patent
Ganigarakoppal Kantharaju et al.

(10) Patent No.: US 12,579,084 B1
(45) Date of Patent: Mar. 17, 2026

(54) OUT-OF-BAND BACKPLANE INFORMATION VERIFICATION SYSTEM

(71) Applicant: Dell Products L.P., Round Rock, TX (US)

(72) Inventors: Nikhith Ganigarakoppal Kantharaju, Hassan (IN); Sumalatha Pagadala, Bangalore (IN); Sushmitha Naik, Udupi (IN)

(73) Assignee: Dell Products L.P., Round Rock, TX (US)

( * ) Notice: Subject to any disclaimer, the term of this patent is extended or adjusted under 35 U.S.C. 154(b) by 5 days.

(21) Appl. No.: 18/905,225

(22) Filed: Oct. 3, 2024

(51) Int. Cl.
*G06F 13/00* (2006.01)
*G06F 13/16* (2006.01)
*G06F 13/42* (2006.01)

(52) U.S. Cl.
CPC ...... *G06F 13/1668* (2013.01); *G06F 13/4221* (2013.01); *G06F 13/4282* (2013.01); *G06F 2213/0016* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 6,956,379 B2 | 10/2005 | Mastoris et al. | |
| 7,890,810 B1 | 2/2011 | Coatney et al. | |
| 11,803,667 B2 * | 10/2023 | Singh | G06F 21/57 |
| 2017/0052841 A1 * | 2/2017 | Ogino | G06F 11/0745 |
| 2018/0351790 A1 * | 12/2018 | Khemani | H04L 41/08 |

* cited by examiner

*Primary Examiner* — Henry Tsai
*Assistant Examiner* — Dean Phan
(74) *Attorney, Agent, or Firm* — Joseph Mencher

(57) ABSTRACT

An out-of-band backplane information verification system includes a backplane, a BMC device coupled to the backplane, and a processing system connected to the backplane and providing an operating system. The operating system retrieves in-band backplane information from the backplane, retrieves first out-of-band backplane information from the BMC device during a first time period, and retrieves second out-of-band backplane information from the BMC device during a second time period that is subsequent to the first time period. The operating system then determines that the second out-of-band backplane information does not match the first out-of-band backplane information and, in response, determines that the second out-of-band backplane information does not match the in-band backplane information. In response to determining that the second out-of-band backplane information does not match each of the first out-of-band backplane information and the in-band backplane information, the operating system initiates an out-of-band backplane information update operation on the backplane.

20 Claims, 16 Drawing Sheets

200

COMPUTING DEVICE
202

NETWORK
204

MANAGEMENT
DEVICE
206

400

OPERATING SYSTEM RETRIEVES AND STORES IN-BAND BACKPLANE INFORMATION
402

OPERATING SYSTEM RETRIEVES OUT-OF-BAND BACKPLANE INFORMATION AND STORES AS "MOST RECENT" OUT-OF-BAND BACKPLANE INFORMATION
404

"CURRENT" OUT-OF-BAND BACKPLANE INFORMATION RETRIEVED?
406

N

Y

A

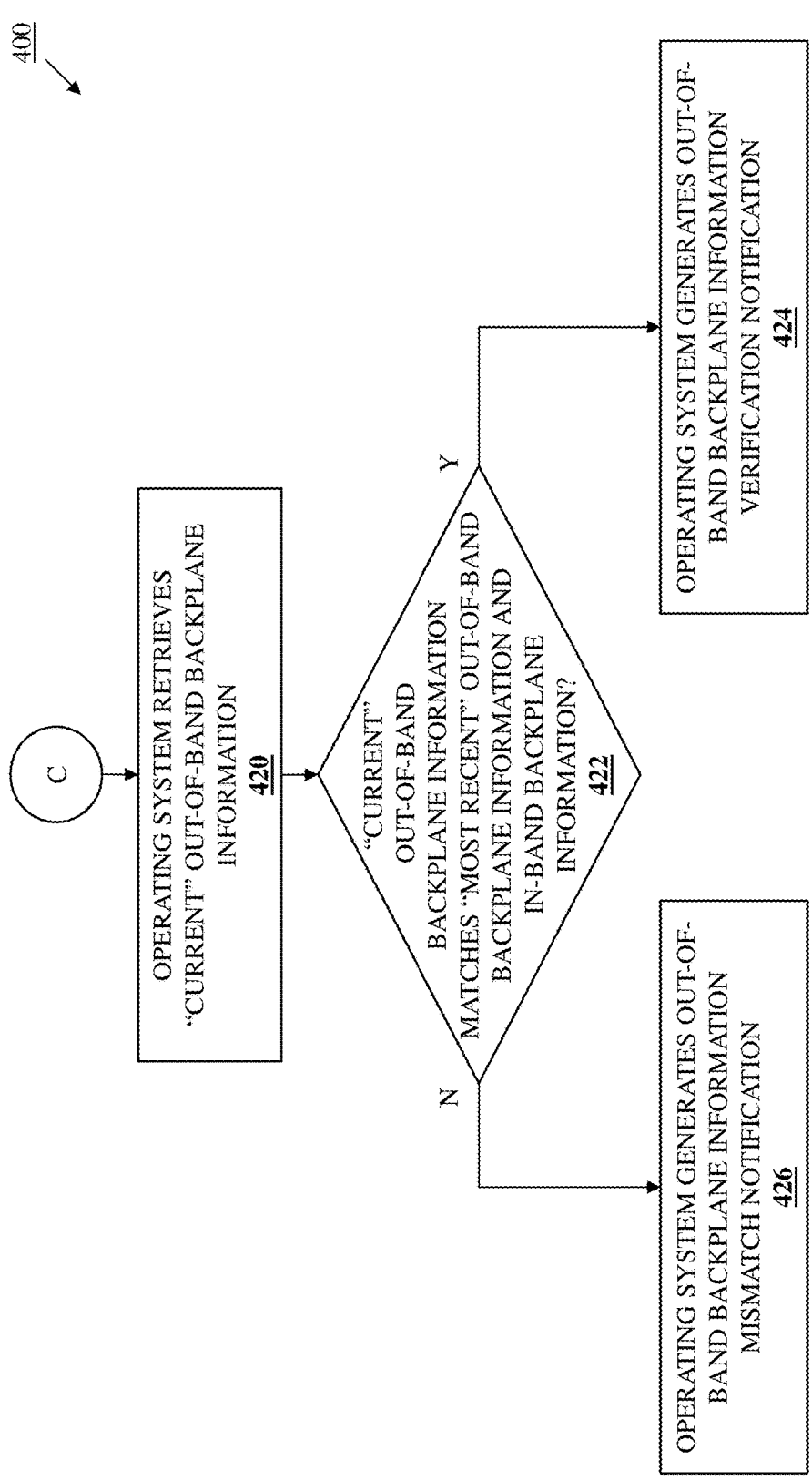

400

C

OPERATING SYSTEM RETRIEVES "CURRENT" OUT-OF-BAND BACKPLANE INFORMATION
420

"CURRENT" OUT-OF-BAND BACKPLANE INFORMATION MATCHES "MOST RECENT" OUT-OF-BAND BACKPLANE INFORMATION AND IN-BAND BACKPLANE INFORMATION?
422

Y

OPERATING SYSTEM GENERATES OUT-OF-BAND BACKPLANE INFORMATION VERIFICATION NOTIFICATION
424

N

OPERATING SYSTEM GENERATES OUT-OF-BAND BACKPLANE INFORMATION MISMATCH NOTIFICATION
426

FIG. 4C

COMPUTING DEVICE 300

IB BACKPLANE INFO 500

OPERATING SYSTEM DATABASE 306

BMC ENGINE 310

604

BMC DATABASE 312

BMC DEVICE 308

602

OPERATING SYSTEM ENGINE 304

CMB SUBSYSTEM 318

CONTROLLER SUBSYSTEM 320

STORAGE DEVICE 316a

STORAGE DEVICE 316b

STORAGE DEVICE 316c

STORAGE DEVICE BACKPLANE 314

302

OUT-OF-BAND BACKPLANE INFORMATION VERIFICATION SYSTEM

BACKGROUND

The present disclosure relates generally to information handling systems, and more particularly to verifying out-of-band backplane information for a backplane in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handlings systems such as, for example, server devices, storage systems, and/or other computing devices known in the art, sometimes include backplanes that couple a plurality of devices to the computing device. For example, some server devices may include storage device backplanes that enable the coupling of a plurality of storage devices (e.g., Non-Volatile Memory express (NVMe) storage devices) to a processing system in the server device for use by an operating system provided by that processing system. In addition, such server devices also include a Baseboard Management Controller (BMC) device that collects out-of-band backplane information about the backplane and its storage devices, and may provide that out-of-band backplane information to an administrator or other user of the server device when requested. However, the conventional collection and provisioning of out-of-band backplane information can raise some issues.

For example, out-of-band backplane information is conventionally collected by a backplane Micro-Controller Unit (MCU) on the backplane, and shared with the BMC device via an Inter-Integrated Circuit (I2C) connection that provides an out-of-band communication channel (i.e., as opposed to an in-band communication channel between the backplane and the processing system in the server device that provides the operating system for the server device as described above). However, in some situations, the out-of-band backplane information stored in the BMC device may be incorrect due to, for example, storage devices being "hot-plugged" to the backplane, storage devices being "hot-removed" from the backplane, storage devices experience faults, communication errors between the backplane MCU and the BMC device, and/or other out-of-band backplane information issues that would be apparent to one of skill in the art in possession of the present disclosure. As will be appreciated by one of skill in the art, the provisioning of incorrect out-of-band backplane information by the BMC device to an administrator or other user results in service calls and the resulting expenditure of customer support resources.

Accordingly, it would be desirable to provide an out-of-band backplane information system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an operating system engine that is configured to: retrieve, from a backplane, in-band backplane information; retrieve, from the backplane via a BMC device, first out-of-band backplane information during a first time period; retrieve, from the backplane via the BMC device, second out-of-band backplane information during a second time period that is subsequent to the first time period; determine that the second out-of-band backplane information does not match the first out-of-band backplane information; determine, in response to determining that the second out-of-band backplane information does not match the first out-of-band backplane information, that the second out-of-band backplane information does not match the in-band backplane information; and initiate, in response to determining that the second out-of-band backplane information does not match the in-band backplane information, an out-of-band backplane information update operation on the backplane.

BRIEF DESCRIPTION OF THE DRAWINGS

FIG. 4C is a flow chart illustrating an embodiment of a portion of the method for verifying out-of-band backplane information.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
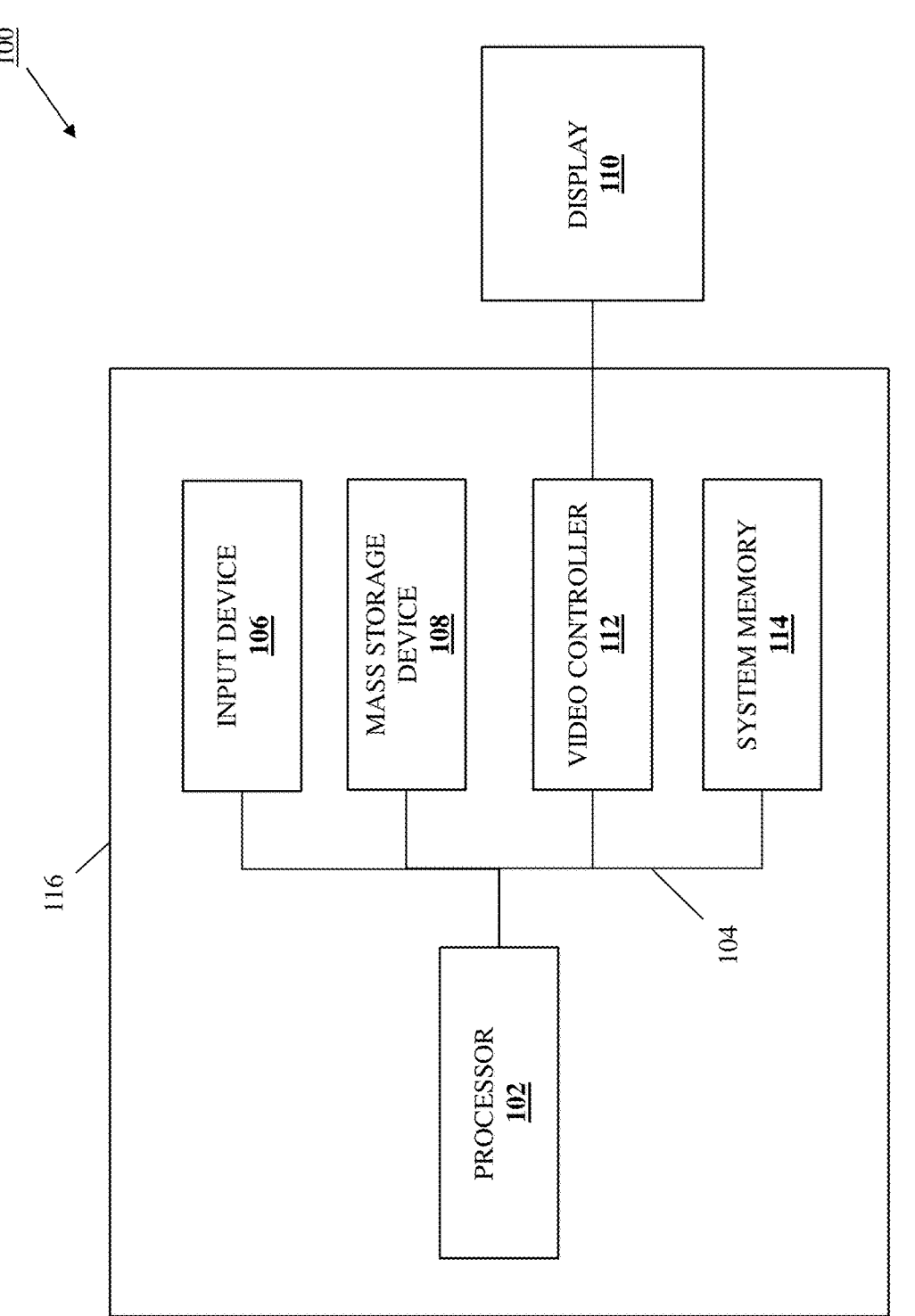
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
FIG. 2 is a schematic view illustrating an embodiment of a networked system that may include the out-of-band backplane information verification system of the present disclosure.
Figure 2:
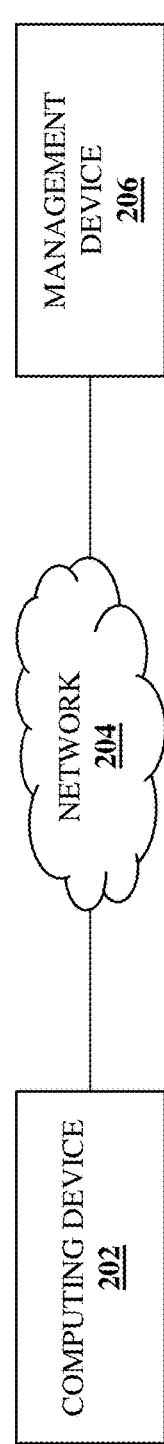
Figure 2:

Referring now to FIG. 2, an embodiment of a networked system 200 is illustrated that may include the out-of-band backplane information verification system of the present disclosure. In the illustrated embodiment, the networked system 200 includes a computing device 202 that may provide the out-of-band backplane information verification system of the present disclosure. In an embodiment, the computing device 202 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that computing devices provided in the networked system 200 may include storage systems and/or any other computing devices that may be configured to operate similarly as the computing device 202 discussed below.

As illustrated, the computing device 202 may be coupled to a network 204 such as a Local Area network (LAN), the Internet, combinations thereof, and/or any other networks that would be apparent to one of skill in the art in possession of the present disclosure. In the examples below, a management device 206 is coupled via the network 204 to the computing device 202. In an embodiment, the management device 206 may be provided by the IHS 100 discussed above with reference to FIG. 1, and/or may include some or all of the components of the IHS 100, and in specific examples may be provided by a desktop computing device, a laptop/notebook computing device, a tablet computing device, a mobile phone, and/or any other management device that would be apparent to one of skill in the art in possession of the present disclosure. However, while illustrated and discussed as being provided by particular management devices, one of skill in the art in possession of the present disclosure will recognize that management devices provided in the networked system 200 may include any other computing devices that may be configured to operate similarly as the management device 206 discussed below. Furthermore, while a specific networked system 200 has been illustrated and described, one of skill in the art in possession of the present disclosure will recognize that networked system providing the out-of-band backplane information verification system of the present disclosure may include a variety of components and component configurations while remaining within the scope of the present disclosure as well.

Figure 3:
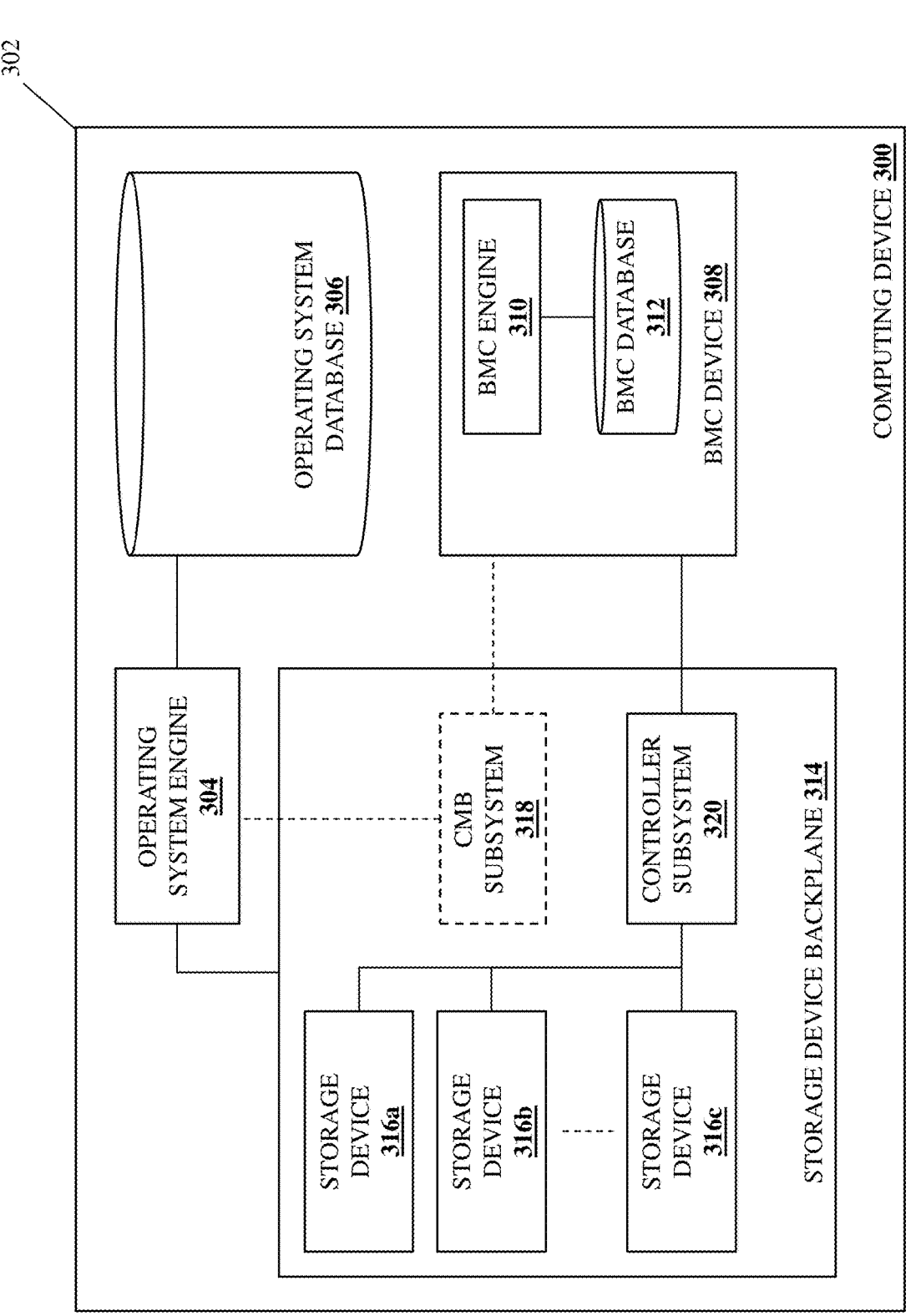
FIG. 3 is a schematic view illustrating an embodiment of a computing device that may provide the out-of-band backplane information verification system of the present disclosure.

Referring now to FIG. 3, an embodiment of a computing device 300 is illustrated that may provide the computing device 202 discussed above with reference to FIG. 2. As such, the computing device 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the computing device 300 may be provided by storage systems and/or any other computing devices that may be configured to operate similarly as the computing device 300 discussed below.

In the illustrated embodiment, the computing device 300 includes a chassis 302 that houses the components of the computing device 300, only some of which are illustrated and described below. For example, the chassis 302 may house a primary processing system (not illustrated, but which may include the processor 102 discussed above with reference to FIG. 1 such as, for example, a Central Processing Unit (CPU)) and a primary memory system (not illustrated, but which may include the memory 114 discussed above with reference to FIG. 1 such as, for example, Dynamic Random Access Memory (DRAM)) that is coupled to the primary processing system and that includes instructions that, when executed by the primary processing system, cause the primary processing system to provide an operating system engine 304 that is configured to provide an operating system for the computing device 300, the device drivers discussed below, and/or otherwise perform the functionality of the operating systems engines, operating systems, device drivers, and/or computing devices discussed below. The chassis 302 may also house a storage system (not illustrated, but which may include the storage 108 discussed above with reference to FIG. 1) that is coupled to the operating system engine 304 (e.g., via a coupling between the storage system and the processing system) and that includes an operating system database 306 that is configured to store any of the information utilized by the operating system engine 304 discussed below.

The chassis 302 may also house a Baseboard Management Controller (BMC) device 308 such as, for example, the integrated DELL® Remote Access Controller (iDRAC) available in server devices provided by DELL® Inc. of Round Rock, Texas, United States, as well as any other BMC devices that would be apparent to one of skill in the art in possession of the present disclosure. In the illustrated example, the BMC device 308 may include a BMC chassis (e.g., a circuit board) that supports a BMC processing system (not illustrated, but which may be similar to the processor 102 discussed above with reference to FIG. 1) and a BMC memory system (not illustrated, but which may be similar to the memory 114 discussed above with reference to FIG. 1) that is coupled to the BMC processing system and that includes instructions that, when executed by the BMC processing system, cause the BMC processing system to provide a BMC engine 310 that is configured to perform the functionality of the BMC engines, BMC subsystems, and/or BMC devices discussed below. The BMC chassis may also support a BMC storage system (not illustrated, but which may be similar to the storage 108 discussed above with reference to FIG. 1) that is coupled to the BMC engine 310 (e.g., via a coupling between the BMC storage system and the BMC processing system) and that includes an BMC database 312 that is configured to store any of the information utilized by the BMC engine 310 discussed below.

In the examples provided below, the BMC device 308 operates as a "consumer" of out-of-band backplane information for the storage device backplane, and one of skill in the art in possession of the present disclosure will appreciate how other subsystems that consume the out-of-band backplane information for the storage device backplane 314 discussed below may be provided in place of, or in addition to, the BMC device 308. For example, a Human Interface Interaction (HII) subsystem may be provided in or coupled to the computing device 300 and may operate similarly as described below for the BMC device 308 while remaining within the scope of the present disclosure as well.

The chassis 302 may also house a backplane that, in the examples illustrated and described below, is provided by a storage device backplane 314 that includes a plurality of storage devices 316a, 316b, and up to 316c. In the embodiments discussed below, the storage devices 316a-316c are described as being provided by Non-Volatile Memory express (NVMe) Solid State Drive (SSD) storage devices, but one of skill in the art in possession of the present disclosure will recognize how other types of storage devices (e.g., Hard Disk Drive (HDD) storage devices) may be provided on the storage device backplane while remaining within the scope of the present disclosure as well. Furthermore, while illustrated and described as being included on the storage device backplane 314, one of skill in the art in possession of the present disclosure will recognize how the storage device backplane 314 may include storage device connectors to which the storage devices 316a-316c may be connected and disconnected, as described in further detail below.

A controller subsystem 320 is included on the storage device backplane 314 and coupled to each of the storage devices 316a-316c, and may be provided by a Micro-Controller Unit (MCU) and/or other backplane controller subsystems that would be apparent to one of skill in the art in possession of the present disclosure. While not illustrated or described in detail, one of skill in the art in possession of the present disclosure will appreciate how the storage device backplane 314 may include a General Purpose Input/Output (GPIO) subsystem, a Complex Programmable Logic Device (CPLD), and/or other components that provide the coupling to (or access to the information described below as being retrieved from) the storage devices 316a-316c. For example, one of skill in the art in possession of the present disclosure will appreciate how the controller subsystem 320 may discover the storage devices 316a-316c via a GPIO subsystem included on the storage device backplane 314.

In some embodiments, the storage device backplane 314 may be connected directly to the primary processing system that provides the operating system engine 304 in order to provide a Direct Attach Storage (DAS) configuration between the primary processing system and the storage devices 316a-316c. However, one of skill in the art in possession of the present disclosure will appreciate how the storage device backplane 314 may be coupled to the primary processing system that provides the operating system engine 304 via a Host Bus Adapter (HBA) or other intermediate device while remaining within the scope of the present disclosure as well. Furthermore, while the backplane used in the out-of-band backplane information verification system of the present disclosure is described as a storage device backplane, one of skill in the art in possession of the present disclosure will appreciate how backplanes supporting other types of devices and/or subsystems will fall within the scope of the present disclosure as well.

In the examples provided below, the primary processing system that provides the operating system engine 304 is connected to the storage device backplane 314 by one or more Peripheral Component Interconnect express (PCIe) connections. In the examples illustrated and described below, the PCIe connection(s) illustrated with a solid line between the operating system engine 304 and the storage device backplane 314 provide an in-band communication channel that is described below as being used to retrieve in-band backplane information. In addition, the PCIe connection(s) also provide access to Controller Memory Buffer (s) (CMB(s)) in one or more of the storage devices 316a-316c (e.g., NVMe SSD storage devices in this example), and those CMB(s) provide a CMB subsystem 318 is included in the storage device backplane 314 and coupled to the operating system engine 304, with that CMB subsystem 318 and coupling illustrated with dashed lines in FIG. 3 to indicate that the CMB(s) that provide that CMB subsystem 318 are actually included in one or more of the storage devices 316a-316c, and the connections that provide that coupling extend between those storage device(s) and the primary processing system that provides the operating system engine 304.

In the examples provided below, the BMC processing system that provides the BMC engine 310 in the BMC device 308 is connected to the storage device backplane 314 by one or more PCIe connections, and those PCIe connection(s) provide access to the CMB subsystem 318 discussed above, with that coupling illustrated with dashed lines in FIG. 3 to indicate that the connections that provide that coupling extend between those storage device(s) and the BMC processing system that provides the BMC engine 310 in the BMC device 308. In a specific example, the CMB subsystem 318 and its couplings to the operating system engine 304 and the BMC device 308 provide a Peripheral Component Interconnect express (PCIe) Vendor Defined Message (VDM) communication channel that allows the communications described below between the operating system engine 304 and the BMC device 308, although one of skill in the art in possession of the present disclosure will appreciate how the operating system engine 304 and the BMC device 308 may communicate in other manners that will fall within the scope of the present disclosure as well. In addition, the BMC processing system that provides the BMC engine 310 in the BMC device 308 is coupled to the controller subsystem 320 in the storage device backplane 314 via an Inter-Integrated Circuit (I2C) connection that provides an out-of-band communication channel that is used to retrieve out-of-band backplane information and described in further detail below.

However, while a specific computing device 300 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the out-of-band backplane information verification functionality discussed below, while remaining within the scope of the present disclosure as well.

Figure 4A:
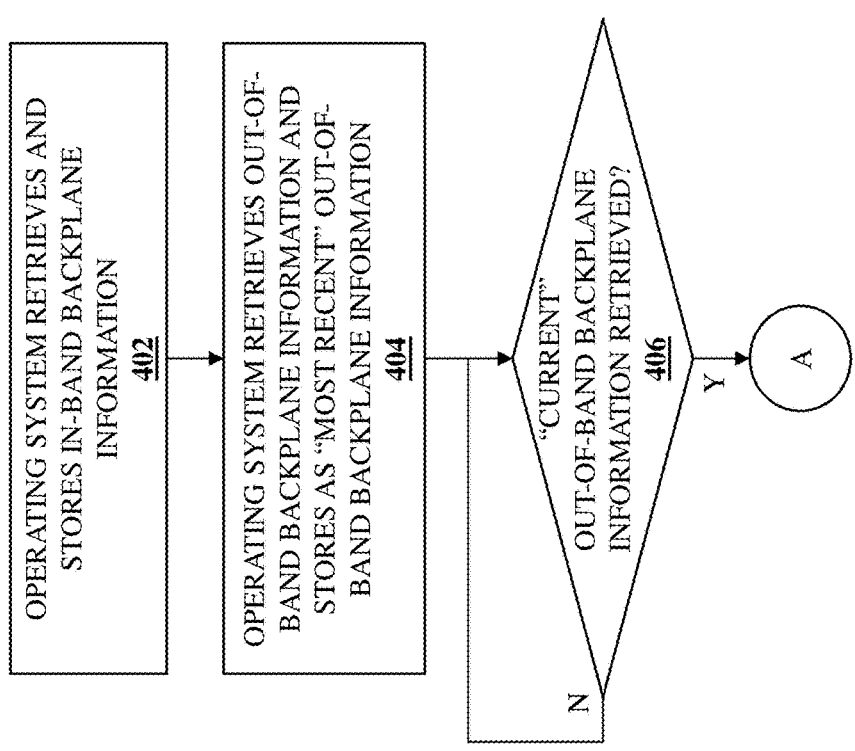
FIG. 4A is a flow chart illustrating an embodiment of a portion of a method for verifying out-of-band backplane information.
Figure 4B:
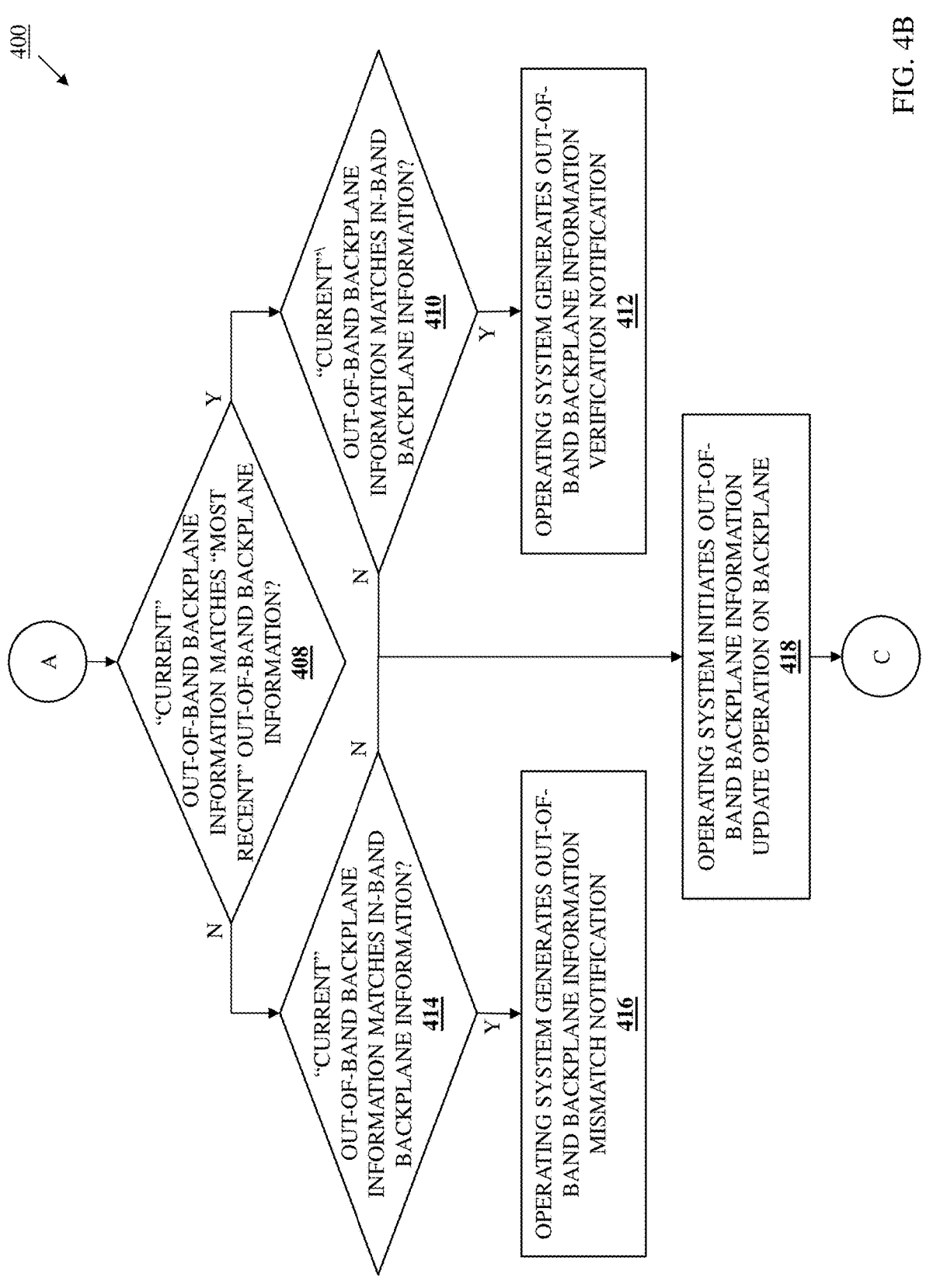
FIG. 4B is a flow chart illustrating an embodiment of a portion of the method for verifying out-of-band backplane information.

Referring now to FIGS. 4A, 4B, and 4C, an embodiment of a method 400 for verifying out-of-band backplane information is illustrated. As discussed below, the systems and methods of the present disclosure provide an operating system engine that attempts to verify "current" out-of-band backplane information stored in a BMC device using "most recent" out-of-band backplane information and in-band backplane information stored by the operating system engine, and either corrects that "current" out-of-band backplane information or reports an issue with the "current" out-of-band backplane information if that verification is unsuccessful. For example, the out-of-band backplane information verification system of the present disclosure may include a backplane, a BMC device coupled to the backplane, and a processing system connected to the backplane and providing an operating system. The operating system retrieves in-band backplane information from the backplane, retrieves first out-of-band backplane information from the BMC device during a first time period, and retrieves second out-of-band backplane information from the BMC device during a second time period that is subsequent to the first time period. The operating system then determines that the second out-of-band backplane information does not match the first out-of-band backplane information and, in response, determines that the second out-of-band backplane information does not match the in-band backplane information. In response to determining that the second out-of-band backplane information does not match each of the first out-of-band backplane information and the in-band backplane information, the operating system initiates an out-of-band backplane information update operation on the backplane. As discussed below, out-of-band backplane information provided by the BMC device to a user may either be verified, corrected if it is not verified, or identified as not matching related backplane information.

Figure 5:
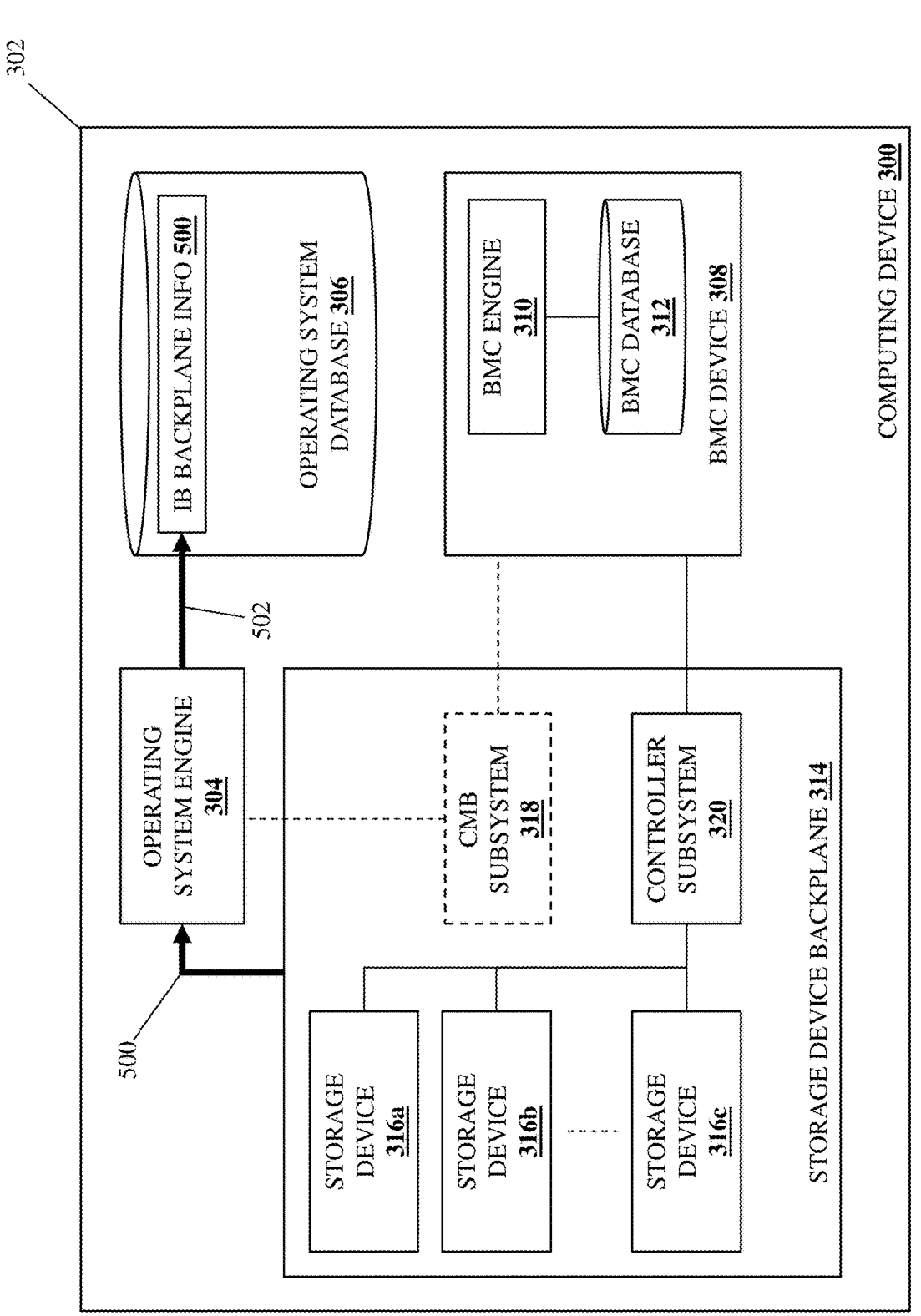
FIG. 5 is a schematic view illustrating an embodiment of the computing device of FIG. 3 operating during the method of FIG. 4.

The method 400 begins at block 402 where an operating system retrieves and stores in-band backplane information. With reference to FIG. 5, in an embodiment of block 402, the operating system engine 304 may perform in-band backplane information retrieval operations 500 that include retrieving in-band backplane information from the storage device backplane 314, followed by in-band backplane information storage operations 502 that include storing the in-band backplane information 500 in the operating system database 306. For example, during initialization of the computing device 300, the operating system engine 304 may provide a Basic Input/Output System (BIOS) driver that uses the PCIe connection/in-band communication channel between the storage device backplane 314 and the operating system engine 304 to retrieve an inventory for the storage device backplane 314 that provides the "in-band backplane information" (i.e., backplane information retrieved by the operating system engine 304 via the in-band communication channel).

In another example, following initialization of the computing device 300 and during runtime of the computing device 300, the operating system engine 304 may provide a an Operating System (OS) driver that uses the PCIe connection/in-band communication channel between the storage device backplane 314 and the operating system engine 304 to retrieve the inventory for the storage device backplane 314 that provides the in-band backplane information (i.e., backplane information retrieved by the operating system engine 304 via the in-band communication channel). As will be appreciated by one of skill in the art in possession of the present disclosure, during runtime of the computing device 300 any changes to the storage device backplane 314 (e.g., connection of a storage device, disconnection of a storage device, modification of a register value, changing of a connection or coupling between the storage device backplane 314 and the computing device 300, and/or any other storage device backplane change that would be apparent to one of skill in the art in possession of the present disclosure) may result in transmission of a storage device backplane change notification to the OS driver provided by the operating system engine 304 that causes the OS driver to retrieve the in-band backplane information as described above.

As such, while the method 400 is illustrated and described as including a single performance of block 402 to retrieve and store of in-band backplane information, one of skill in the art in possession of the present disclosure will appreciate how block 402 may be performed any time a change occurs with the storage device backplane 314 throughout the method 400, and thus how the in-band backplane information 500 provides a relatively accurate version of the backplane information for the storage device backplane 314 at any time during the method 400.

As will be appreciated by one of skill in the art in possession of the present disclosure, the inventory of the storage device backplane 314 that provides the in-band backplane information 500 may include any storage device information about the storage devices 316a-316c (e.g., any physical storage device information such as the storage device presence information described herein) that would be apparent to one of skill in the art in possession of the present disclosure, any connection information describing connections between the storage device backplane 314 and the computing device 300 that would be apparent to one of skill in the art in possession of the present disclosure, any register information associated with the storage device backplane 314 that would be apparent to one of skill in the art in possession of the present disclosure, and/or any other backplane inventory information known in the art. However, while a plurality of particular storage device backplane inventory information has been described, one of skill in the art in possession of the present disclosure will appreciate how other in-band backplane information for other backplanes will fall within the scope of the present disclosure as well.

Figure 6A:
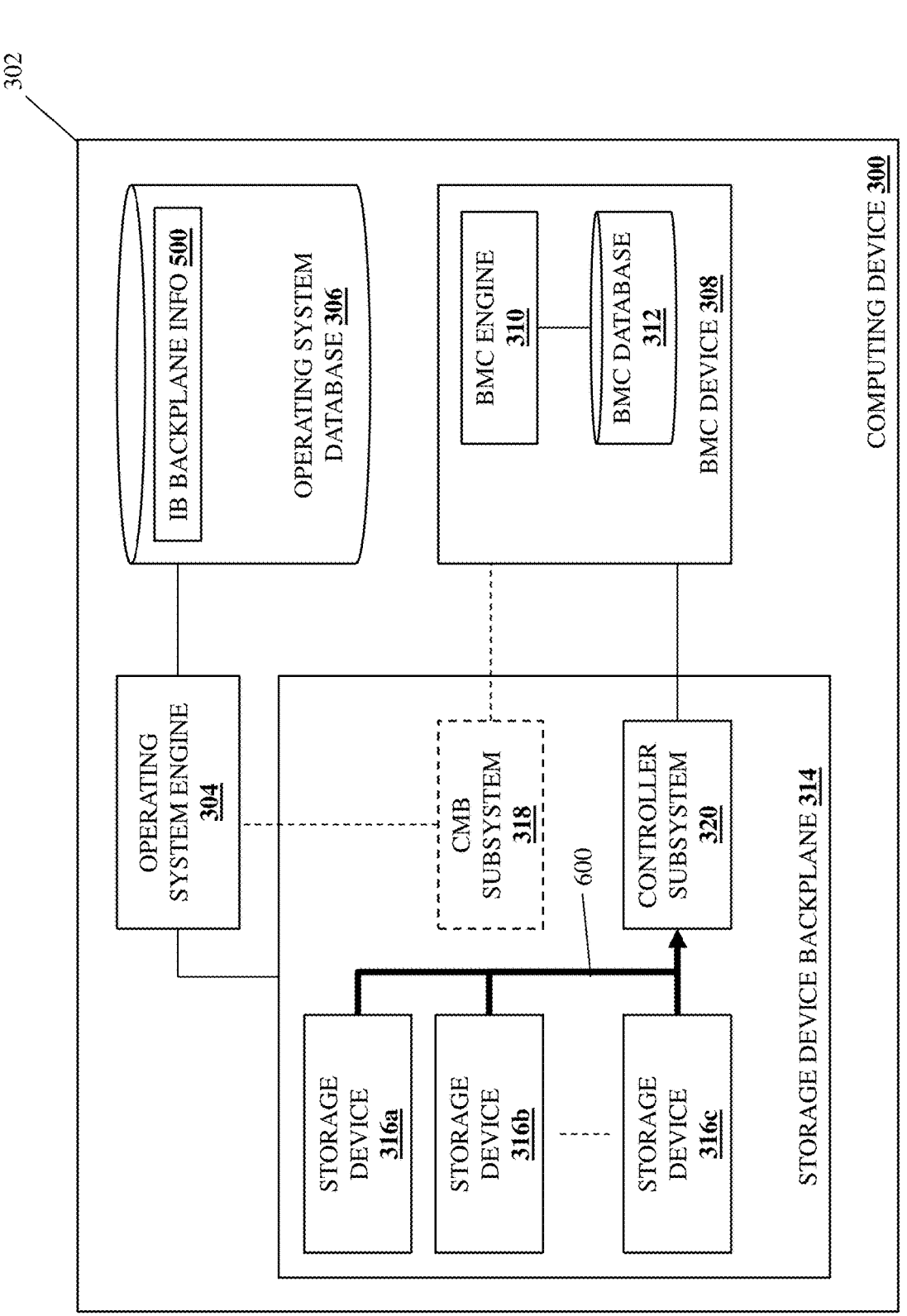
FIG. 6A is a schematic view illustrating an embodiment of the computing device of FIG. 3 operating during the method of FIG. 4.

The method 400 then proceeds to block 404 where the operating system retrieves out-of-band backplane information and stores it as "most recent" out-of-band backplane information. With reference to FIG. 6A, in an embodiment and during or prior to block 404, the controller subsystem 320 may perform backplane information retrieval operations 600 that include retrieving backplane information, with the backplane information illustrated in FIG. 6A as being retrieved from the storage devices 316a-316c. However, while illustrated and described as being retrieved from the storage devices 316a-316c by the controller subsystem 320, as discussed below the backplane information for the storage device backplane 314 may be retrieved from a GPIO subsystem, a CPLD, and/or any other components on the storage device backplane 314 that would be apparent to one of skill in the art in possession of the present disclosure.

As described below, in some embodiments, the backplane information may be provided by the controller subsystem 320 in a backplane controller subsystem memory map that identifies any storage device information about the storage devices 316a-316c (e.g., any physical storage device information such as the storage device presence information described herein) that would be apparent to one of skill in the art in possession of the present disclosure, any connection information describing connections between the storage device backplane 314 and the computing device 300 that would be apparent to one of skill in the art in possession of the present disclosure, any register information associated with the storage device backplane 314 that would be apparent to one of skill in the art in possession of the present disclosure, and/or any other backplane controller subsystem memory map known in the art. However, while a plurality of specific backplane controller subsystem memory map information has been described, one of skill in the art in possession of the present disclosure will appreciate how other backplane controller subsystem memory map information for other backplanes will fall within the scope of the present disclosure as well.

Figure 6B:
FIG. 6B is a schematic view illustrating an embodiment of the computing device of FIG. 3 operating during the method of FIG. 4.

With reference to FIG. 6B, in an embodiment and during or prior to block 404, the controller subsystem 302 may then perform out-of-band backplane information provisioning operations 602 that include providing the backplane information retrieved from the storage device backplane 314 to the BMC engine 310 in the BMC device 308 via the out-of-band communication channel provided by the I2C connection such that the BMC engine 310 receives "out-of-band backplane information" for the storage device backplane 314 (i.e., backplane information retrieved by the BMC engine 310 via the out-of-band communication channel). The BMC engine 310 may then perform out-of-band backplane information storage operations 604 that include storing the out-of-band backplane information in the BMC database 312.

Figure 7A:
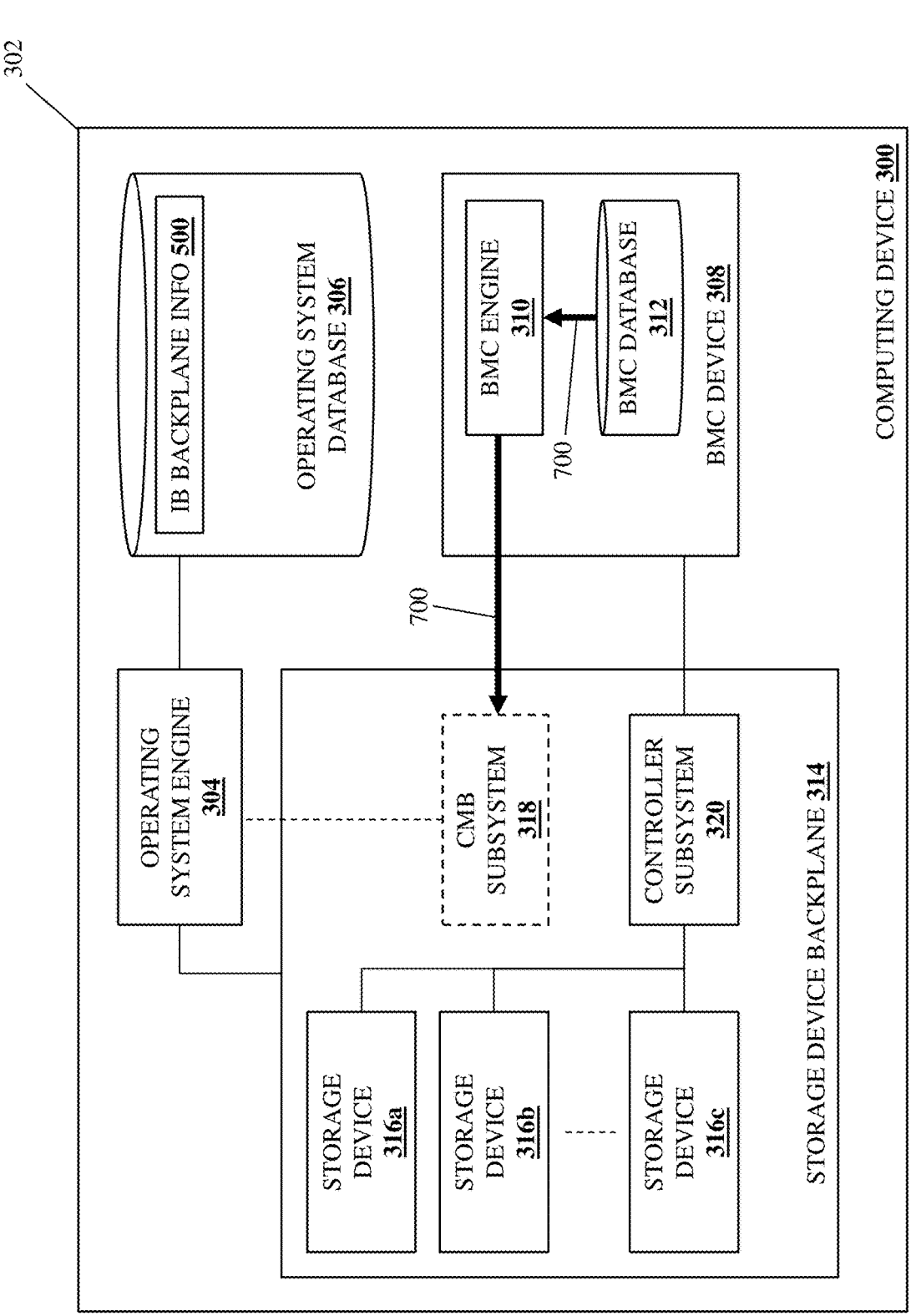
FIG. 7A is a schematic view illustrating an embodiment of the computing device of FIG. 3 operating during the method of FIG. 4.

With reference to FIG. 7A, in an embodiment of block 404, the BMC engine 310 in the BMC device 308 may perform out-of-band backplane information provisioning operations 606 that include retrieving the out-of-band backplane information stored in the BMC database 312, and providing that out-of-band backplane information in the CMB subsystem 318 on the storage device backplane 314 (i.e., storing that out-of-band backplane information in one or more CMBs that are included in the storage devices 316a-316c as described above). As will be appreciated by one of skill in the art in possession of the present disclosure, in some examples the out-of-band backplane information provisioning operations 606 may be performed by the BMC engine 310 in response to a request for the out-of-band backplane information from the operating system engine 304 (e.g., a device driver provided by the operating system engine 304 may provide a request for the out-of-band backplane information in the CMB subsystem 318, and the BMC engine 310 may identify that request and, in response, perform the out-of-band backplane information provisioning operations 606). However, while a specific example has been described, one of skill in the art in possession of the present disclosure will appreciate how the BMC device 308 may provide the out-of-band backplane information in the CMB subsystem 318 using a variety of techniques that will fall within the scope of the present disclosure.

Figure 7B:
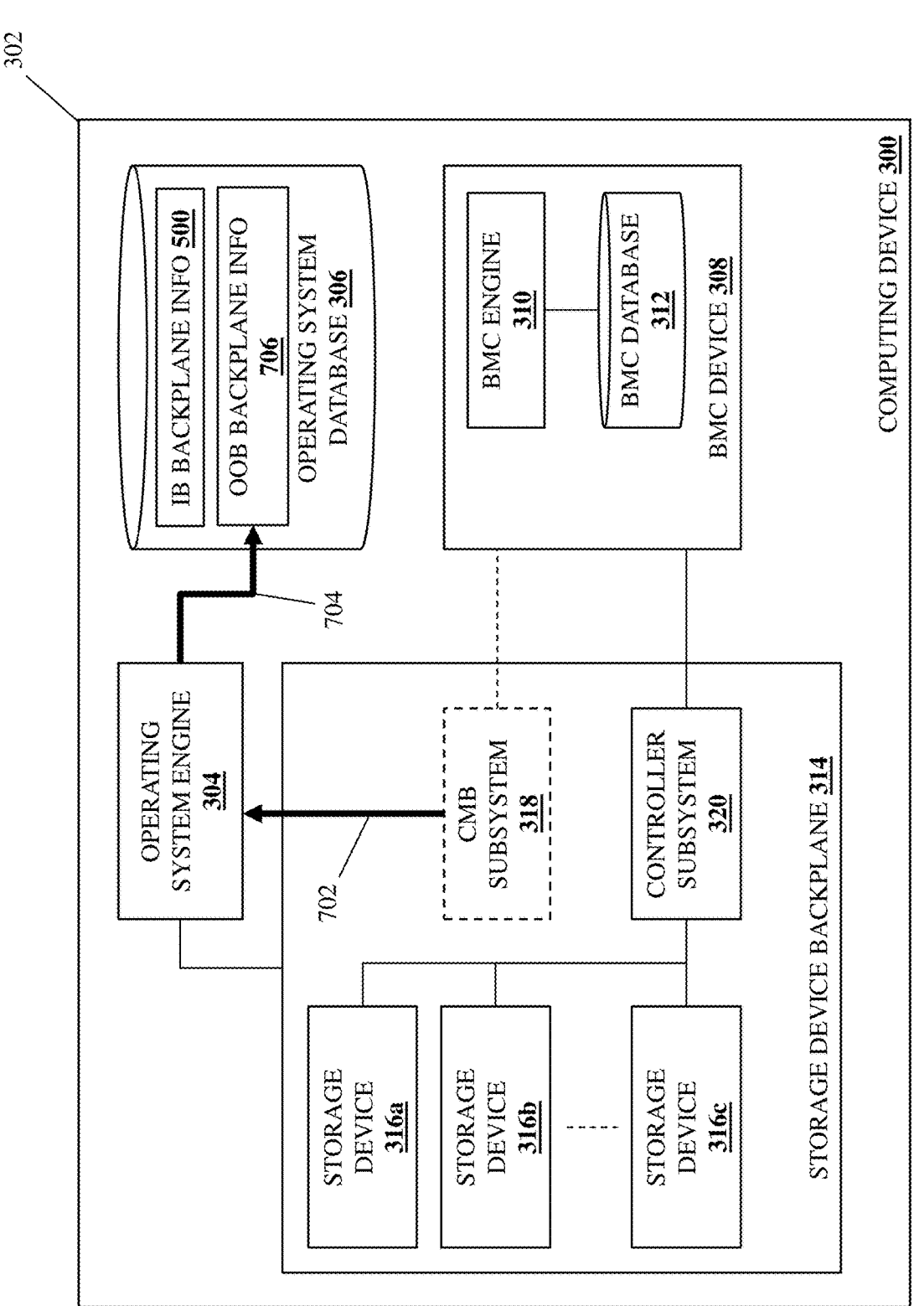
FIG. 7B is a schematic view illustrating an embodiment of the computing device of FIG. 3 operating during the method of FIG. 4.

With reference to FIG. 7B, in an embodiment of block 404, the operating system engine 304 may perform out-of-band backplane information retrieval operations 702 that include retrieving the out-of-band backplane information from the CMB subsystem 318 (i.e., retrieving that out-of-band backplane information from one or more CMBs that are included in the storage devices 316a-316c as described above), as well as out-of-band backplane information storage operations 704 that include storing out-of-band backplane information 706 in the operating system database 306. As discussed above, a device driver provided by the operating system engine 304 may retrieve the out-of-band backplane information from the CMB subsystem 318 and store that out-of-band backplane information in response to requesting it, and/or using a variety of other techniques that would be apparent to one of skill in the art in possession of the present disclosure.

As will be appreciated by one of skill in the art in possession of the present disclosure, block 404 of the method 400 is described herein as providing for a "first" or "initial" retrieval and storage of the "out-of-band" backplane information in the operating system database 306, and for the purposes of the method 400 that out-of-band backplane information is considered "most recent" out-of-band backplane information following it storage, with that "most recent" out-of-band backplane information discussed below as being used for comparison to "current" out-of-band backplane information that is subsequently retrieved during some later time period. As such, one of skill in the art in possession of the present disclosure will appreciate how block 404 of the method 400 may be omitted in situations where the operating system engine 304 has previously stored "most recent" out-of-band backplane information.

The method 400 then proceeds to decision block 406 where the method 400 proceeds based on whether "current" out-of-band backplane information is retrieved. As described below, during any particular "current" time period that is subsequent to storage the "most recent" out-of-band backplane information, the operating system engine 304 may operate to retrieve "current" out-of-band backplane information from the BMC device 308 in order to perform the out-of-band backplane information verifications of the present disclosure. For example, and similarly as described above, the method 400 may proceed at decision block 406 based on whether a device driver provided by the operating system engine 304 has provided a periodic request for the out-of-band backplane information in the CMB subsystem 318. However, one of skill in the art in possession of the present disclosure will appreciate how the "current" out-of-band backplane information may be retrieved in other manners that will fall within the scope of the present disclosure as well, and thus how decision block 406 may proceed similarly as described below based on whether that "current" out-of-band backplane information is retrieved. If, at decision block 406, "current" out-of-band backplane information is not retrieved, the method 400 returns to decision block 406. As such, the method 400 may loop until "current" out-of-band backplane information is retrieved by the operating system engine 304.

If, at decision block 406, "current" out-of-band backplane information is retrieved, the method 400 proceeds to decision block 408 where it is determined whether the "current" out-of-band backplane information matches the "most recent" out-of-band backplane information. In an embodiment, during or prior to decision block 406, the controller subsystem 320 may retrieve backplane information for the storage device backplane 314 and provide out-of-band backplane information to the BMC engine 310 for storage in the BMC database 312 similarly as described above with reference to FIGS. 6A and 6B, with the BMC engine 310 providing that out-of-band backplane information in the CMB subsystem 318 similarly as described above with reference to FIG. 7A.

Figure 8:
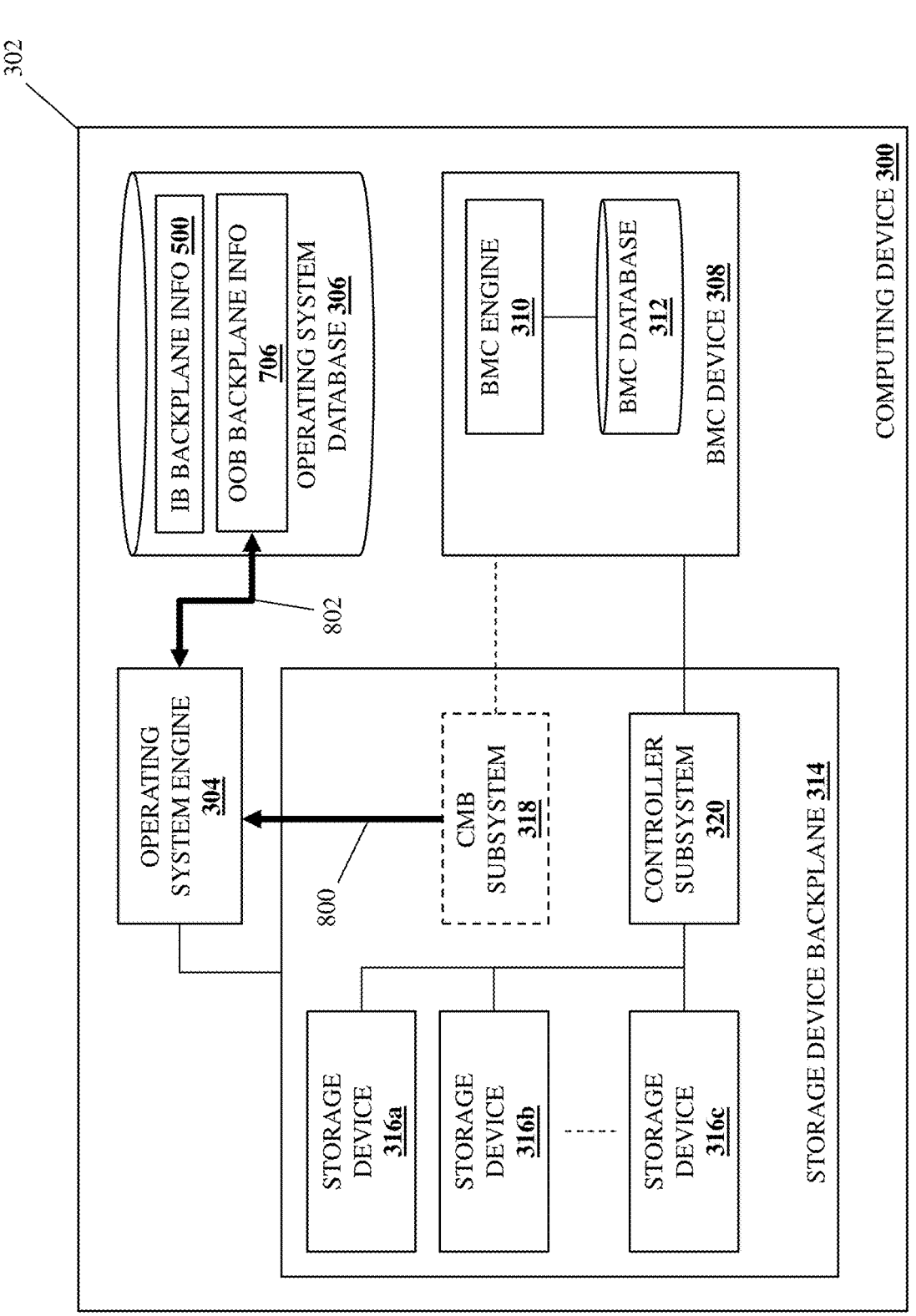
FIG. 8 is a schematic view illustrating an embodiment of the computing device of FIG. 3 operating during the method of FIG. 4.

With reference to FIG. 8, at decision block 406 and similarly as described above, the operating system engine 304 may perform out-of-band backplane information retrieval operations 800 that include retrieving the out-of-band backplane information from the CMB subsystem 318 (i.e., retrieving that out-of-band backplane information from one or more CMBs that are included in the storage devices 316a-316c as described above). As discussed above, decision block 406 of the method 400 is described herein as performing a "second" or "subsequent" retrieval of the "out-of-band" backplane information from the BMC device 308, and for the purposes of the method 400 that out-of-band backplane information is considered "current" out-of-band backplane information for use in comparison to "most-recent" out-of-band backplane information 706 that was retrieved during some previous time period and stored in the operating system database 706.

With continued reference to FIG. 8, in an embodiment of decision block 408, the operating system engine 304 may perform "current"/"most recent" out-of-band backplane information match determination operations 802 that include comparing the "current" out-of-band backplane information retrieved at decision block 406 with the "most recent" out-of-band backplane information 706 stored in the operating system database 306 to determine whether they match. As such, continuing with the specific examples provided above, at decision block 408 the operating system engine 304 may compare the respective backplane controller subsystem memory maps that provide the "current" out-of-band backplane information retrieved at decision block 406 and the "most recent" out-of-band backplane information 706 stored in the operating system database 306 to determine whether a mismatch exists in their storage device information about the storage devices 316a-316c, their connection information describing connections between the storage device backplane 314 and the computing device 300, their register information associated with the storage device backplane 314, and/or any other backplane controller subsystem memory map information that would be apparent to one of skill in the art in possession of the present disclosure.

If, at decision block 408, it is determined that the "current" out-of-band backplane information matches the "most" recent out-of-band backplane information, the method 400 proceeds to decision block 410 where it is determined whether the "current" out-of-band backplane information matches the in-band backplane information. In an embodiment, at decision block 410 and in response to determining that the "current" out-of-band backplane information retrieved at decision block 406 matches the "most recent" out-of-band backplane information 706 stored in the operating system database 306, the operating system engine 304 may perform "current" out-of-band/in-band backplane information match determination operations 900 that include comparing the "current" out-of-band backplane information retrieved at decision block 406 with the in-band backplane information 500 stored in the operating system database 306 to determine whether they match.

As such, continuing with the specific examples provided above, at decision block 408 the operating system engine 304 may compare the backplane controller subsystem memory map that provides the "current" out-of-band backplane information retrieved at decision block 406 and the inventory for the storage device backplane 314 that provides the in-band backplane information 500 to determine whether a mismatch exists in their storage device information about the storage devices 316a-316c, their connection information describing connections between the storage device backplane 314 and the computing device 300, their register information associated with the storage device backplane 314, and/or any other backplane controller subsystem memory map information/storage device inventory information that would be apparent to one of skill in the art in possession of the present disclosure.

If, at decision block 410, it is determined that the "current" out-of-band backplane information matches the in-band backplane information, the method 400 proceeds to block 412 where the operating system generates an out-of-band backplane information verification notification. In an embodiment, at block 412 and in response to determining that the "current" out-of-band backplane information retrieved at decision block 406 matches both the "most recent" out-of-band backplane information 706 and the in-band backplane information 500 stored in the operating system database 306, the operating system engine 304 may perform out-of-band backplane information verification notification generation operations that include generating an out-of-band backplane information verification notification that is configured to notify a user that the out-of-band backplane information stored in the BMC device 308 has been verified. In some embodiments, the out-of-band backplane information verification notification generated at block 412 may be provided in a log (e.g., in the operating system, in the BMC device 308, etc.).

Figure 10:
FIG. 10 is a schematic view illustrating an embodiment of the networked system of FIG. 2 operating during the method of FIG. 4.
Figure 10:
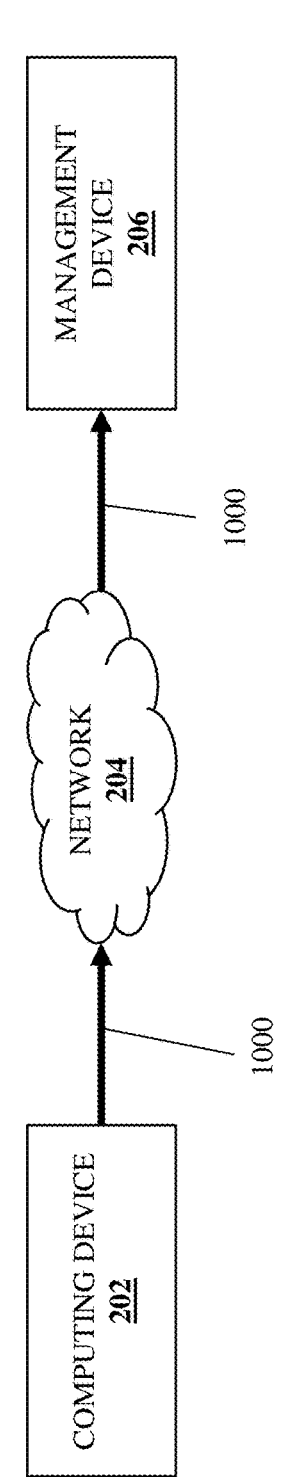

However, in other embodiments, the out-of-band backplane information verification notification generated at block 412 may be provided for display to an administrator or other user. For example, with reference to FIG. 10, the operating system engine 304 in the computing device 202/300 may perform notification provisioning operations 1000 that, in this example, include transmitting the out-of-band backplane information verification notification via the network 204 for display on the management device 206. However, while specific examples of notifications of the verification of out-of-band backplane information have been provided, one of skill in the art in possession of the present disclosure will appreciate how a variety of operations may be performed in response to the verification of the out-of-band backplane information while remaining within the scope of the present disclosure as well.

Thus, the out-of-band backplane information verification system of the present disclosure may verify "current" out-of-band backplane information being used by the BMC device 308 by determining that "current" out-of-band backplane information matches both "most recent" out-of-band backplane information and in-band backplane information stored by the operating system engine 304.

If, at decision block 408, it is determined that the "current" out-of-band backplane information does not match the "most" recent out-of-band backplane information, the method 400 proceeds to decision block 414 where it is determined whether the "current" out-of-band backplane information matches the in-band backplane information. As will be appreciated by one of skill in the art in possession of the present disclosure, at decision block 408 the "current" out-of-band backplane information retrieved at decision block 406 may not match the "most recent" out-of-band backplane information 706 stored in the operating system database 306 due to, for example, a storage device providing the CMB subsystem 318 being "hot-removed" or otherwise becoming unavailable (in which case the provisioning of the CMB subsystem 318 must be switched over to the CMB in another of the storage devices, which can prevent the operating system engine 304/BMC device 308 communications described above and result in the out-of-band backplane information being used by the BMC device 308 being updated such that it is different than the out-of-band backplane information 706), changes in the storage device backplane 314 being performed in between the operating system engine 304 retrieving the out-of-band backplane information being used by the BMC device 308, and/or due to other issues that would be apparent to one of skill in the art in possession of the present disclosure.

Figure 9:
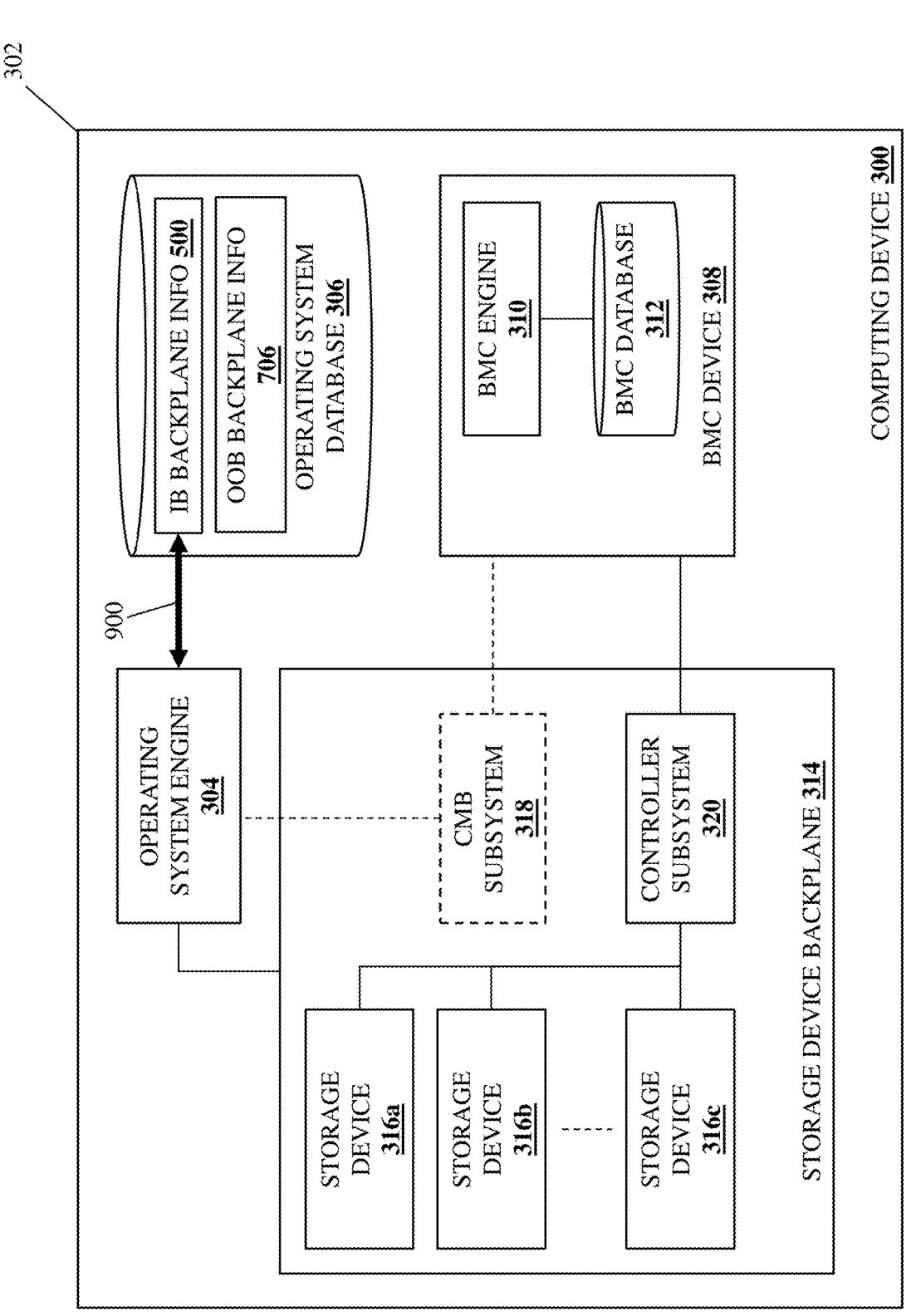
FIG. 9 is a schematic view illustrating an embodiment of the computing device of FIG. 3 operating during the method of FIG. 4.

In response to determining the "current" out-of-band backplane information retrieved at decision block 406 does not match the "most recent" out-of-band backplane information 706 stored in the operating system database 306, the operating system engine 304 may perform the "current" out-of-band/in-band backplane information match determination operations 900 discussed above with reference to FIG. 9 that include comparing the "current" out-of-band backplane information retrieved at decision block 406 with the in-band backplane information 500 stored in the operating system database 306 to determine whether they match. In some embodiments, in response to determining the "current" out-of-band backplane information retrieved at decision block 406 does not match the "most recent" out-of-band backplane information 706 stored in the operating system database 306, the operating system engine 304 may identify the cause of the mismatch between the "current" out-of-band backplane information and the "most recent" out-of-band backplane information 706 (e.g., a connected storage device, a disconnected storage device, a modification of a register value in the storage device backplane 314, a changed connection or coupling between the storage device backplane 314 and the computing device 300, etc.), and determine whether a similar mismatch exists between the "current" out-of-band backplane information and the in-band backplane information 706 (i.e., a whether a mismatch between the "current" out-of-band backplane information and the in-band backplane information exists due to a similar cause).

If, at decision block 414, it is determined that the "current" out-of-band backplane information matches the in-band backplane information, the method 400 proceeds to block 416 where the operating system generates an out-of-band backplane information mismatch notification. In an embodiment, at block 416 and in response to determining that the "current" out-of-band backplane information retrieved at decision block 406 does not match the "most recent" out-of-band backplane information 706 stored in the operating system database 306 but does match the in-band backplane information 500 stored in the operating system database 306, the operating system may perform out-of-band backplane information mismatch notification generation operations that include generating an out-of-band backplane information mismatch notification that is configured to notify a user that the out-of-band backplane information stored in the BMC device 308 does not match the "most recent" out-of-band backplane information retrieved from the BMC device 308, but does match the in-band backplane information stored in the operating system database 306. In some embodiments, the out-of-band backplane information verification notification generated at block 412 may be provided in a log (e.g., in the operating system, in the BMC device 308, etc.).

However, in other embodiments and similarly as described above, the out-of-band backplane information mismatch notification generated at block 416 may be provided for display to an administrator or other user. For example, with reference back to FIG. 10, the notification provisioning operations 1000 performed by the operating system engine 304 in the computing device 202/300 may include, in this example, transmitting the out-of-band backplane information mismatch notification via the network 204 for display on the management device 206, although the "pushing" of the out-of-band backplane information mismatch notification via the BMC device 308 to a Graphical User Interface (GUI) accessible via the BMC device 308 will fall within the scope of the present disclosure as well. However, while specific examples of notifications of the mismatch of "current" out-of-band backplane information with "most recent" out-of-band backplane information have been provided, one of skill in the art in possession of the present disclosure will appreciate how a variety of operations may be performed in response to detecting the mismatch of "current" out-of-band backplane information with "most recent" out-of-band backplane information while remaining within the scope of the present disclosure as well.

Thus, the out-of-band backplane information verification system of the present disclosure may detect when "current" out-of-band backplane information being used by the BMC device 308 does not match "most recent" backplane information retrieved from the BMC device 308, but does match in-band backplane information stored by the operating system engine 304 and, in response, may notify an administrator or other user of that mismatch. As will be appreciated by one of skill in the art in possession of the present disclosure, in such a situation in which the "current" out-of-band backplane information being used by the BMC device 308 matches the in-band backplane information stored in the operating system database 306, the "current" out-of-band backplane information being used by the BMC device 308 is correct, and likely has recently been updated in the BMC device 308. Furthermore, one of skill in the art in possession of the present disclosure will also appreciate that the notification of the mismatch to the administrator or other user is such a situation is optional and may be skipped in some embodiments.

If, at decision block 412 or decision block 414, it is determined that the "current" out-of-band backplane information does not match the in-band backplane information, the method 400 proceeds to block 418 where the operating system initiates an out-of-band backplane information update operation on the backplane. As will be appreciated by one of skill in the art in possession of the present disclosure, the "current" out-of-band backplane information may not match the in-band backplane information due changes in the storage device backplane 314 being updated in the in-band backplane information 500 prior to those changes being updated in the out-of-band backplane information being used by the BMC device 308, and/or other issues that would be apparent to one of skill in the art in possession of the present disclosure.

Figure 11:
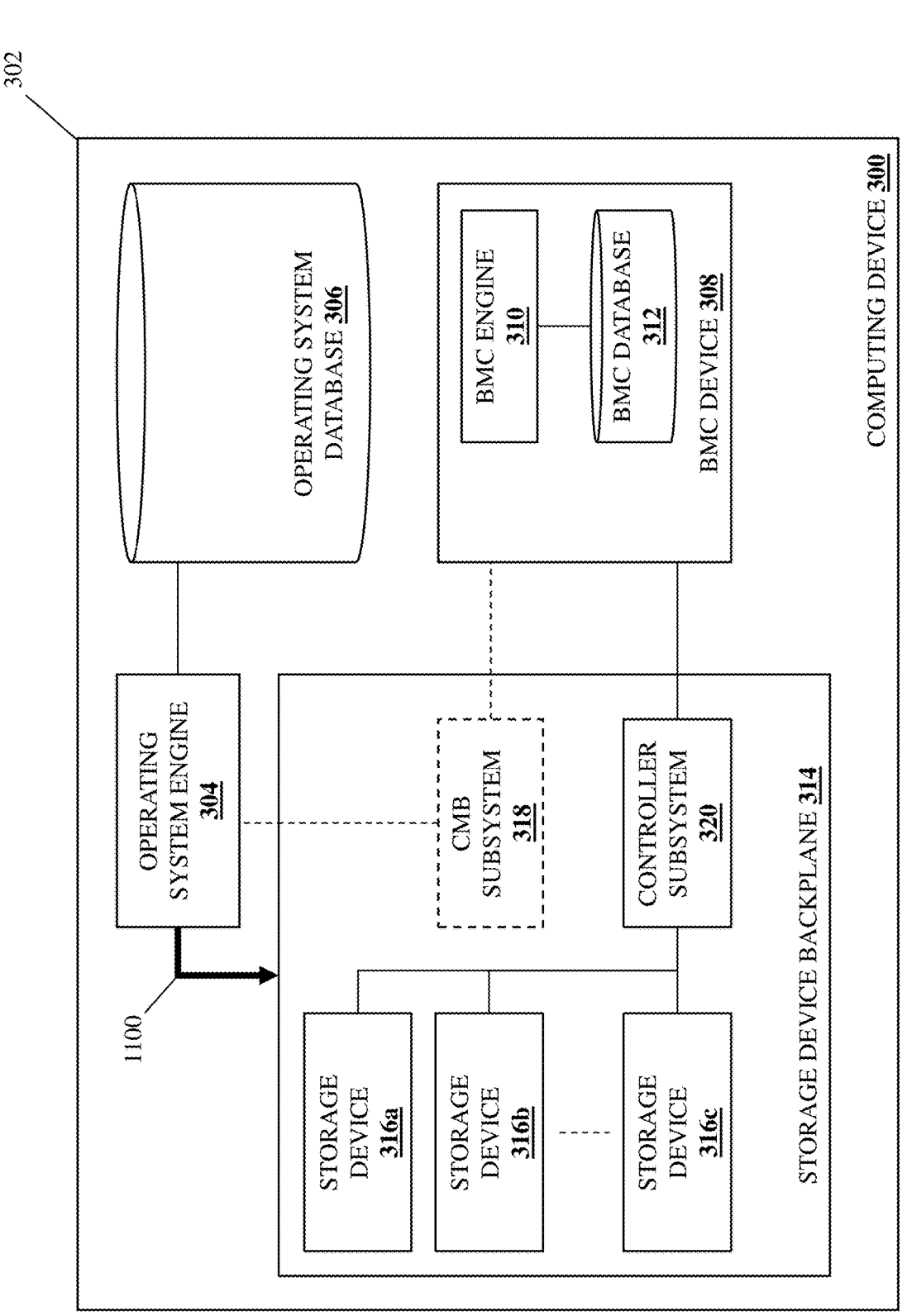
FIG. 11 is a schematic view illustrating an embodiment of the computing device of FIG. 3 operating during the method of FIG. 4.

With reference to FIG. 11, in response to determining that the "current" out-of-band backplane information retrieved at decision block 406 does not match the in-band backplane information 706 stored in the operating system database 306 at decision block 412 or 414, the operating system engine 304 may perform out-of-band backplane information update operation initiation operations 1100 that include initiating an out-of-band backplane information update operation on the storage device backplane 314 that may include, for example, resetting (or causing a reset of) the controller subsystem 320 on the storage device backplane 314, which one of skill in the art in possession of the present disclosure will appreciate will cause the controller subsystem 320 to subsequently retrieve and provide out-of-band backplane information to the BMC device 308 similarly as described above with reference to FIGS. 6A and 6B following its reset.

However, while a specific out-of-band backplane information update operation has been described, one of skill in the art in possession of the present disclosure will appreciate how other out-of-band backplane information update operations will fall within the scope of the present disclosure as well. For example, at block 418 the operating system engine 304 may cause the BMC engine 310 in the BMC device 308 to perform a register write to a register in the storage device backplane 314 to, for example, change storage device backplane information (e.g., change a status of a storage device slot) in the event that storage device backplane information resulted in the "current" out-of-band/in-band backplane information mismatch discussed above (followed by the controller subsystem 320 subsequently providing out-of-band backplane information to the BMC device 308 similarly as described above with reference to FIGS. 6A and 6B).

Figure 12:
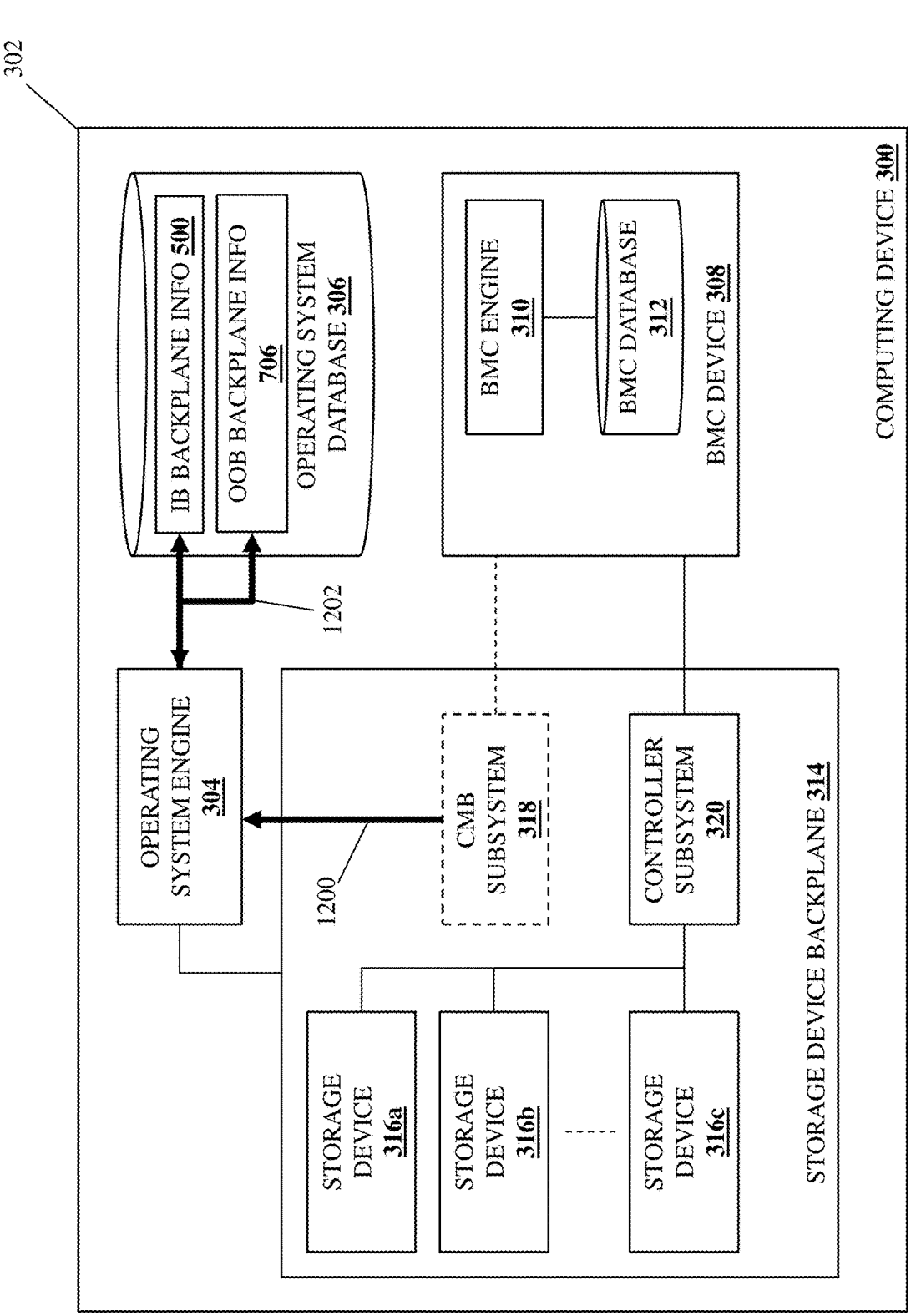
FIG. 12 is a schematic view illustrating an embodiment of the computing device of FIG. 3 operating during the method of FIG. 4.

The method 400 then proceeds to block 420 where the operating system retrieves "current" out-of-band backplane information. With reference to FIG. 12 and similarly as described above with reference to FIG. 8, at decision block 420 the operating system engine 304 may perform the out-of-band backplane information retrieval operations 1200 that are similar to the out-of-band backplane information retrieval operations 800 discussed above and that include retrieving the out-of-band backplane information from the CMB subsystem 318 (i.e., retrieving that out-of-band backplane information from one or more CMBs that are included in the storage devices 316a-316c as described above). As discussed above, decision block 420 of the method 400 is described herein as performing a "third" or "subsequent" retrieval of the "out-of-band" backplane information from the BMC device 308, and for the purposes of the method 400 that out-of-band backplane information is considered "current" out-of-band backplane information for use in comparison to "most-recent" out-of-band backplane information 706 that was retrieved and stored in the operating system database 706 at block 404 of the method 400.

The method 400 then proceeds to decision block 422 where it is determined whether the "current" out-of-band backplane information matches the "most recent" out-of-band backplane information and the in-band backplane information. With continued reference to FIG. 12, in an embodiment of block 422 and similarly as described above with reference to FIGS. 8 and 9, the operating system engine 304 may perform "current" out-of-band backplane information/"most recent" out-of-band backplane information/in-band backplane information match determination operations 1202 that are similar to the "current"/"most recent" out-of-band backplane information match determination operations 802 and the "current" out-of-band/in-band backplane information match determination operations 900 described above, and that operate to determine whether the "current" out-of-band backplane information retrieved at block 420 matches both the "most" recent out-of-band backplane information and the in-band backplane information stored in the operating system database 306.

If, at decision block 422, it is determined that the "current" out-of-band backplane information matches the "most recent" out-of-band backplane information and the in-band backplane information, the method 400 proceeds to block 424 where the operating system generates an out-of-band backplane information verification notification. In an embodiment, at block 424 and similarly as described above, the operating system engine 304 may perform out-of-band backplane information verification notification generation operations that include generating an out-of-band backplane information verification notification that is configured to notify a user that the out-of-band backplane information stored in the BMC device 308 has been verified. As discussed above, the out-of-band backplane information verification notification may be provided in a log, provided for display to an administrator or other user on the management device 206, etc.

Thus, the out-of-band backplane information verification system of the present disclosure may determine when "current" out-of-band backplane information being used by the BMC device 308 does not match in-band backplane information stored by the operating system engine 304, initiate an out-of-band backplane information update operation to remedy the mismatch, and then subsequently verify the "current" out-of-band backplane information being used by the BMC device 308.

If, at decision block 422, it is determined that the "current" out-of-band backplane information does not match the "most recent" out-of-band backplane information and the in-band backplane information, the method 400 proceeds to block 426 where the operating system generates an out-of-band backplane information mismatch notification. In an embodiment, at block 426 and similarly as described above, the operating system engine 304 may perform out-of-band backplane information mismatch notification generation operations that include generating an out-of-band backplane information mismatch notification that is configured to notify a user that the out-of-band backplane information stored in the BMC device 308 does not match in-band backplane information stored in the operating system database 306. As will be appreciated by one of skill in the art in possession of the present disclosure, in the event the out-of-band backplane information update operation at block 418 "fails" or otherwise does not result in the "current" out-of-band backplane information matching the "most recent" out-of-band backplane information at decision block 422, the storage device backplane 314 should be serviced or replaced, and the out-of-band backplane information mismatch notification may include such a recommendation to the administrator or other user. As discussed above, the out-of-band backplane information mismatch notification may be provided in a log, provided for display to an administrator or other user on the management device 206, etc.

Thus, the out-of-band backplane information verification system of the present disclosure may determine when "current" out-of-band backplane information being used by the BMC device 308 does not match in-band backplane information stored by the operating system engine 304 and, in the event that mismatch cannot be remedied, may subsequently notify the user of that mismatch. As will be appreciated by one of skill in the art in possession of the present disclosure, in such a situation in which the "current" out-of-band backplane information being used by the BMC device 308 does not match the in-band backplane information stored in the operating system database 306, the "current" out-of-band backplane information being used by the BMC device 308 is incorrect, and its mismatch following the out-of-band backplane information update operations likely identifies a need to replace the storage device backplane 314 and/or components located thereon.

Thus, systems and methods have been described that provide an operating system engine that attempts to verify "current" out-of-band backplane information stored in a BMC device using "most recent" out-of-band backplane information and in-band backplane information stored by the operating system engine, and either corrects that "current" out-of-band backplane information or reports an issue with the "current" out-of-band backplane information if that verification is unsuccessful. For example, the out-of-band backplane information verification system of the present disclosure may include a backplane, a BMC device coupled to the backplane, and a processing system connected to the backplane and providing an operating system. The operating system retrieves in-band backplane information from the backplane, retrieves first out-of-band backplane information from the BMC device during a first time period, and retrieves second out-of-band backplane information from the BMC device during a second time period that is subsequent to the first time period. The operating system then determines that the second out-of-band backplane information does not match the first out-of-band backplane information and, in response, determines that the second out-of-band backplane information does not match the in-band backplane information. In response to determining that the second out-of-band backplane information does not match each of the first out-of-band backplane information and the in-band backplane information, the operating system initiates an out-of-band backplane information update operation on the backplane. As such, out-of-band backplane information provided by the BMC device to a user may either be verified, corrected if it is not verified, or identified as not matching related backplane information.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An out-of-band backplane information verification system, comprising:
    a backplane;
    a Baseboard Management Controller (BMC) device that is coupled to the backplane;
    a processing system that is connected to the backplane and that is configured to provide an operating system engine that is configured to:
        retrieve, from the backplane, in-band backplane information;
        retrieve, from the backplane via the BMC device, first out-of-band backplane information during a first time period;
        retrieve, from the backplane via the BMC device, second out-of-band backplane information during a second time period that is subsequent to the first time period;
        determine that the second out-of-band backplane information does not match the first out-of-band backplane information;
        determine, in response to determining that the second out-of-band backplane information does not match the first out-of-band backplane information, that the second out-of-band backplane information does not match the in-band backplane information; and
        initiate, in response to determining that the second out-of-band backplane information does not match the in-band backplane information, an out-of-band backplane information update operation on the backplane.

2. The system of claim 1, wherein the operating system engine is configured to:
    retrieve, from the backplane via the BMC device, third out-of-band backplane information during a third time period;
    retrieve, from the backplane via the BMC device, fourth out-of-band backplane information during a fourth time period that is subsequent to the third time period;
    determine that the fourth out-of-band backplane information does not match the third out-of-band backplane information;
    determine, in response to determining that the fourth out-of-band backplane information does not match the third out-of-band backplane information, that the fourth out-of-band backplane information matches the in-band backplane information; and
    transmit, in response to determining that the fourth out-of-band backplane information matches the in-band backplane information, an out-of-band backplane information mismatch notification.

3. The system of claim 1, wherein the operating system engine is configured to:
    retrieve, from the backplane via the BMC device, third out-of-band backplane information during a third time period;
    retrieve, from the backplane via the BMC device, fourth out-of-band backplane information during a fourth time period that is subsequent to the third time period;
    determine that the fourth out-of-band backplane information matches the third out-of-band backplane information;

determine, in response to determining that the fourth out-of-band backplane information matches the third out-of-band backplane information, that the fourth out-of-band backplane information does not match the in-band backplane information; and initiate, in response to determining that the fourth out-of-band backplane information does not match the in-band backplane information, an out-of-band backplane information update operation on the backplane.

4. The system of claim 1, wherein the backplane is connected to a plurality of storage devices, and the backplane information includes storage device presence information.

5. The system of claim 1, wherein the backplane information recovery operation includes resetting a controller subsystem in the backplane.

6. The system of claim 1, wherein the first out-of-band backplane information and the second out-of-band backplane information are retrieved by the BMC device from the backplane via an out-of-band communication channel provided by an Inter-Integrated Circuit (I2C) connection, and wherein the first out-of-band backplane information and the second out-of-band backplane information are retrieved by the operating system engine from the BMC device via a Peripheral Component Interconnect express (PCIe) Vendor Defined Message (VDM) communication channel.

7. An Information Handling System (IHS), comprising:

a processing system; and a memory system that is coupled to the processing system and that includes instructions that, when executed by the processing system, cause the processing system to provide an operating system engine that is configured to:

retrieve, from a backplane, in-band backplane information;

retrieve, from the backplane via a BMC device, first out-of-band backplane information during a first time period;

retrieve, from the backplane via the BMC device, second out-of-band backplane information during a second time period that is subsequent to the first time period;

determine that the second out-of-band backplane information does not match the first out-of-band backplane information;

determine, in response to determining that the second out-of-band backplane information does not match the first out-of-band backplane information, that the second out-of-band backplane information does not match the in-band backplane information; and initiate, in response to determining that the second out-of-band backplane information does not match the in-band backplane information, an out-of-band backplane information update operation on the backplane.

8. The IHS of claim 7, wherein the operating system engine is configured to:

retrieve, from the backplane via the BMC device, third out-of-band backplane information during a third time period;

retrieve, from the backplane via the BMC device, fourth out-of-band backplane information during a fourth time period that is subsequent to the third time period;

determine that the fourth out-of-band backplane information does not match the third out-of-band backplane information;

determine, in response to determining that the fourth out-of-band backplane information does not match the third out-of-band backplane information, that the fourth out-of-band backplane information matches the in-band backplane information; and transmit, in response to determining that the fourth out-of-band backplane information matches the in-band backplane information, an out-of-band backplane information mismatch notification.

9. The IHS of claim 7, wherein the operating system engine is configured to:

retrieve, from the backplane via the BMC device, third out-of-band backplane information during a third time period;

retrieve, from the backplane via the BMC device, fourth out-of-band backplane information during a fourth time period that is subsequent to the third time period;

determine that the fourth out-of-band backplane information matches the third out-of-band backplane information;

determine, in response to determining that the fourth out-of-band backplane information matches the third out-of-band backplane information, that the fourth out-of-band backplane information does not match the in-band backplane information; and initiate, in response to determining that the fourth out-of-band backplane information does not match the in-band backplane information, an out-of-band backplane information update operation on the backplane.

10. The IHS of claim 7, wherein the backplane is connected to a plurality of storage devices, and the backplane information includes storage device presence information.

11. The IHS of claim 7, wherein the backplane information recovery operation includes resetting a controller subsystem in the backplane.

12. The IHS of claim 7, wherein the in-band backplane information is retrieved from the backplane via an in-band communication channel provided by a Peripheral Component Interconnect express (PCIe) Vendor Defined Message (VDM) communication channel, and the out-of-band backplane information is retrieved from the backplane via an out-of-band communication channel is an Inter-Integrated Circuit (I2C) communication channel.

13. The IHS of claim 7, wherein each of the first out-of-band backplane information and the second out-of-band backplane information includes a backplane controller subsystem memory map.

14. A method for verifying out-of-band backplane information, comprising:

retrieving, by an operating system from a backplane, in-band backplane information;

retrieving, by the operating system from the backplane via a BMC device, first out-of-band backplane information during a first time period;

retrieving, by the operating system from the backplane via the BMC device, second out-of-band backplane information during a second time period that is subsequent to the first time period;

determining, by the operating system, that the second out-of-band backplane information does not match the first out-of-band backplane information;

determining, by the operating system in response to determining that the second out-of-band backplane information does not match the first out-of-band backplane information, that the second out-of-band backplane information does not match the in-band backplane information; and initiating, by the operating system in response to determining that the second out-of-band backplane information does not match the in-band backplane information, an out-of-band backplane information update operation on the backplane.

15. The method of claim 14, further comprising:

retrieving, by the operating system from the backplane via the BMC device, third out-of-band backplane information during a third time period;

retrieving, by the operating system from the backplane via the BMC device, fourth out-of-band backplane information during a fourth time period that is subsequent to the third time period;

determining, by the operating system, that the fourth out-of-band backplane information does not match the third out-of-band backplane information;

determining, by the operating system in response to determining that the fourth out-of-band backplane information does not match the third out-of-band backplane information, that the fourth out-of-band backplane information matches the in-band backplane information; and transmitting, by the operating system in response to determining that the fourth out-of-band backplane information matches the in-band backplane information, an out-of-band backplane information mismatch notification.

16. The method of claim 14, further comprising:

retrieving, by the operating system from the backplane via the BMC device, third out-of-band backplane information during a third time period;

retrieving, by the operating system from the backplane via the BMC device, fourth out-of-band backplane information during a fourth time period that is subsequent to the third time period;

determining, by the operating system, that the fourth out-of-band backplane information matches the third out-of-band backplane information;

determining, by the operating system in response to determining that the fourth out-of-band backplane information matches the third out-of-band backplane information, that the fourth out-of-band backplane information does not match the in-band backplane information; and initiating, by the operating system in response to determining that the fourth out-of-band backplane information does not match the in-band backplane information, an out-of-band backplane information update operation on the backplane.

17. The method of claim 14, wherein the backplane is connected to a plurality of storage devices, and the backplane information includes storage device presence information.

18. The method of claim 14, wherein the backplane information recovery operation includes resetting a controller subsystem in the backplane.

19. The method of claim 14, wherein the in-band backplane information is retrieved from the backplane via an in-band communication channel provided by a Peripheral Component Interconnect express (PCIe) Vendor Defined Message (VDM) communication channel, and the out-of-band backplane information is retrieved from the backplane via an out-of-band communication channel is an Inter-Integrated Circuit (I2C) communication channel.

20. The method of claim 14, wherein each of the first out-of-band backplane information and the second out-of-band backplane information includes a backplane controller subsystem memory map.

* * * * *